United States Patent Office 2,859,763
Patented Nov. 11, 1958

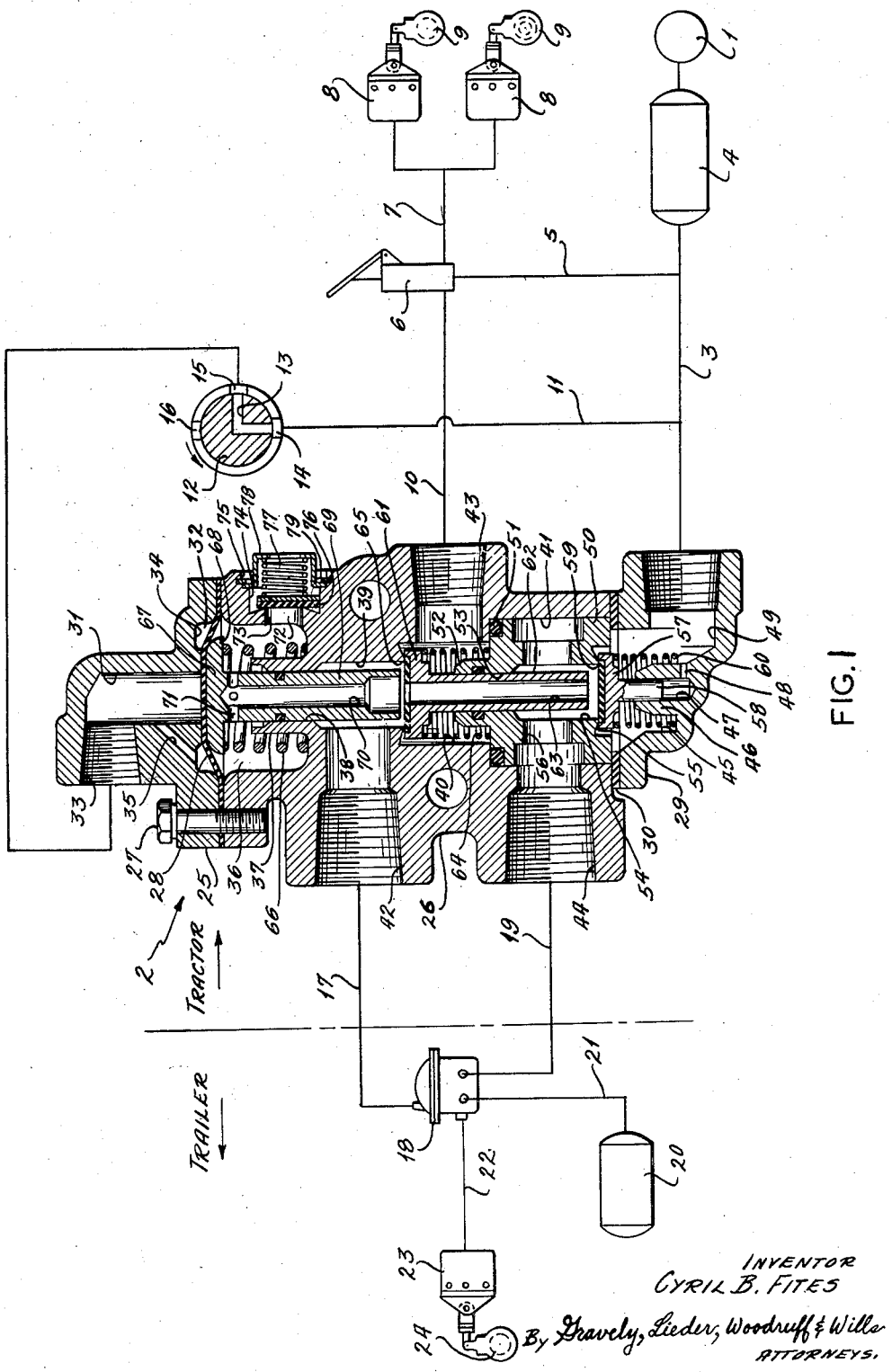

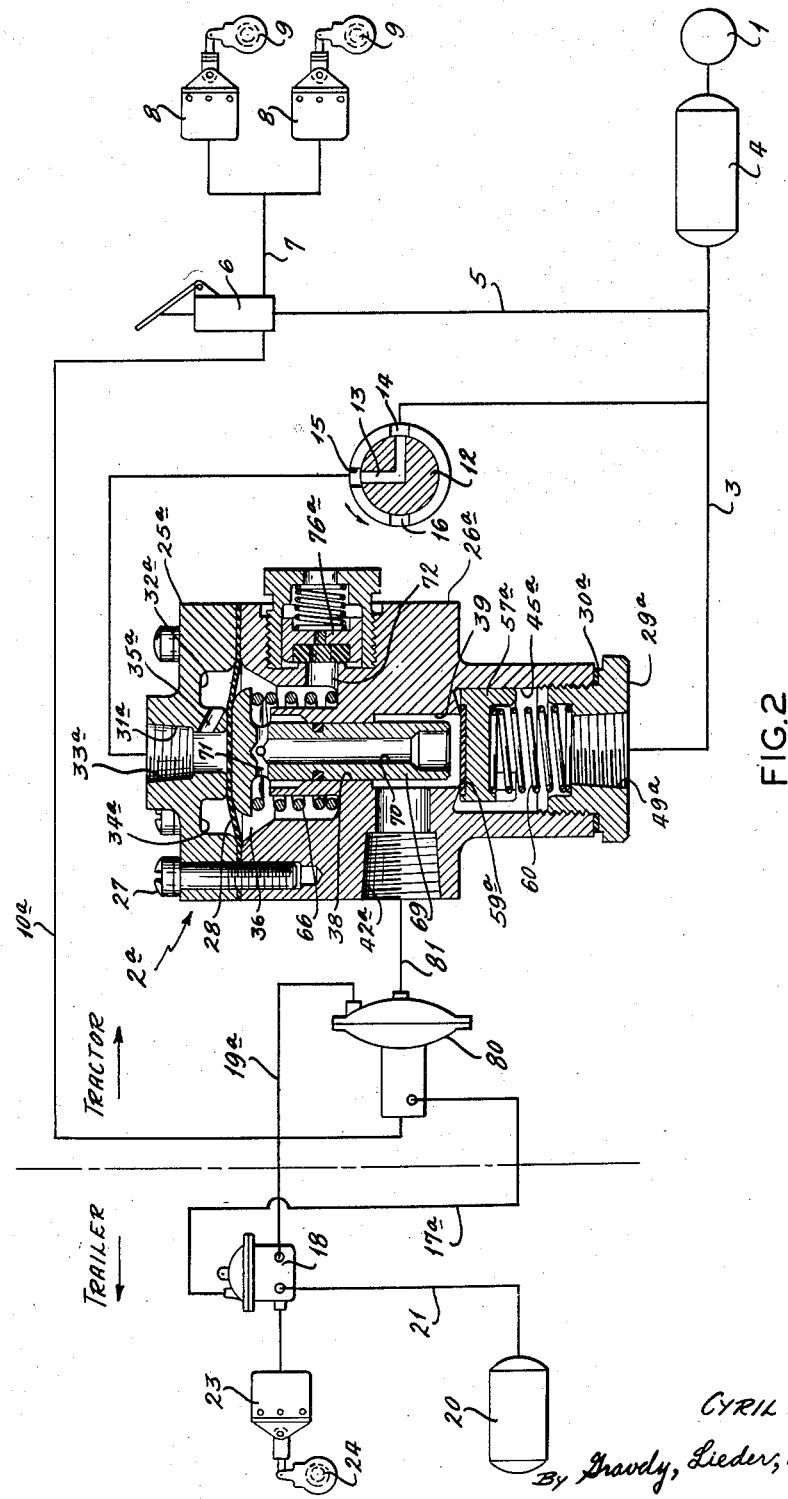

2,859,763

TRACTOR PROTECTOR VALVE

Cyril B. Fites, St. Johns, Mo., assignor to Wagner Electric Corporation, St. Louis County, Mo., a corporation of Delaware Application February 28, 1957, Serial No. 643,017

9 Claims. (Cl. 137—102)

This invention relates to tractor-trailer fluid pressure braking systems and in particular to a tractor protector valve employed therein.

In the conventional tractor-trailer fluid pressure braking system of the past, the function of the tractor protector valve and the related functions of the trailer relay emergency valve are well known to those skilled in the art. The tractor protector valve provides pressure fluid communication between the tractor and trailer reservoirs through an emergency line whereby the latter is constantly charged with pressure fluid. When a severe leak develops in the emergency line or when said emergency line is severed, as in a tractor break-away situation, the tractor protector valve is operable to immediately interrupt pressure fluid communication between the tractor and trailer reservoirs, thereby maintaining the fluid pressure integrity of the tractor braking systems; and, said tractor protector valve is also operable to immediately vent the emergency line to the trailer relay emergency valve thereby initiating the emergency function thereof.

As well known in the art, two different types of trailer relay emergency valves are employed in trailer braking systems; the metering type and the non-metering type, both of which function to cause an emergency application of the trailer brakes when the fluid pressure in the system is depleted at a very fast rate, as in the previously described tractor break-away situation. During a slow leakdown of fluid pressure from the system, the metering type is constructed to cause an emergency application of the trailer brakes at a predetermined minimum fluid pressure; however, since the non-metering type is constructed to cause an emergency application of the trailer brakes at a predetermined fluid pressure differential between the trailer reservoir and the emergency line, said emergency application is obviated because of the pressure fluid feed back from the trailer reservoir into the system which eventually depletes the pressure fluid in said trailer reservoir.

One of the objects of the present invention is to provide a tractor protector valve compatibly operable in a tractor-trailer braking system under all emergency conditions with both the metering and non-metering type trailer relay emergency valve.

Another object of the present invention is to provide a tractor protector valve which positively exhausts a trailer emergency line at a predetermined certain or minimum fluid pressure.

Another object of the present invention is to provide a tractor protector valve having a one-way check valve in the exhaust thereof to enhance snap or quick action of said tractor protector valve. Another object is to provide a check valve in the exhaust chamber to insure positive and substantially instantaneous movement of the valves in said tractor protector valve to their emergency positions.

These and other objects and advantageous features will become apparent hereinafter.

Briefly, the preferred embodiment comprises a housing having diaphragm means therein in pressure fluid communication with a tractor fluid pressure source, said diaphragm being movable in one direction in response to said pressure fluid to control a plurality of valves and establish pressure fluid communication between said tractor fluid pressure source and a trailer fluid pressure source while interrupting pressure fluid communication between said sources and an exhaust. Upon a diminution of the fluid pressure in the tractor source, spring means are provided to overcome the diaphragm means at a predetermined minimum fluid pressure in said tractor source whereby the plurality of valves are repositioned thereby interrupting fluid pressure communication between said sources and establishing fluid pressure communication between said trailer source and said exhaust, said exhaust having a check valve therein creating a predetermined fluid pressure effective upon said diaphragm to assist said spring means.

The invention also consists in the parts and in the arrangements and combinations of parts hereinafter described and claimed. In the accompanying drawings which form part of this specification and wherein like numerals and symbols refer to like parts wherever they occur:

Fig. 1 is a schematic diagram of a conventional tractor-trailer fluid pressure braking system showing a preferred embodiment of the invention in cross-section, and Fig. 2 shows a similar diagram of a system having a modified tractor protector valve therein.

Referring now to Fig. 1 in detail, the tractor-trailer braking system is provided with a compressor 1 which is connected to the emergency line inlet of a tractor protector valve 2 by an emergency line, or conduit, 3 having a reservoir 4 interposed therein. A conduit 5 connects the inlet side of an application valve 6 with the conduit 3, and another conduit 7 has one end connected to the service, or outlet, side of said application valve while the other end thereof connects with a plurality of power cylinders, indicated generally at 8, which in turn are operatively linked with their respective slack adjusters 9 which actuate the wheel brake assemblies (not shown) of the tractor. A service line, or conduit, 10 is interposed between the service line inlet of the tractor protector valve 2 and the service, or outlet, side of the application valve 6; and, another conduit 11 is interposed between the emergency line 3 and the charging inlet of said tractor protector valve 2 having a charging valve 12 interposed therein. The charging valve 12 is provided with a passage 13 normally permitting pressure fluid flow from the inlet 14 to the outlet 15; however, said valve 12 may be rotated counterclockwise (in direction of arrow) to interrupt the above mentioned fluid flow and reposition said passage to vent the outlet 15 to atmosphere via the exhaust port 16 for purposes to be discussed hereinafter.

A trailer service line or conduit 17 connects the service outlet of the tractor protector valve 2 with the service line inlet of a trailer relay emergency valve 18 which may be either the metering or non-metering type both of which are well known in the art, as discussed hereinbefore. A trailer emergency line or conduit 19 connects the emergency line outlet of the tractor protector valve 2 with the inlet of the trailer relay emergency valve 18. A trailer air reservoir 20 is connected to the trailer relay emergency valve 18 by a conduit 21; and, another conduit 22 connects the service outlet of said trailer relay emergency valve with a plurality of air chambers, indicated generally at 23 which are operatively linked with slack adjusters 24 which actuate the trailer wheel brake assemblies (not shown).

The tractor protector valve 2 comprises an upper housing 25 which is sealably connected to the upper end of an intermediate or main housing 26 by suitable means, such as studs 27, having a resilient member or flexible diaphragm 28 mounted therebetween. A lower cap portion lower housing 29 is sealably connected to the lower end of the intermediate housing 26 by studs (not shown) having a resilient gasket 30 mounted therebetween.

The upper housing 25 is provided with a vertical passage 31 and an axially aligned first chamber 32. The upper end of the passage 31 is intersected by a charging port 33 which is connected with the conduit 11, as previously mentioned, while the mid-portion of said passage 31 is connected to an annular recess 34 in the upper end wall of the chamber 32 circumscribing said passage by an angularly disposed passage 35. The flexible diaphragm 28 forms a movable wall between the chamber 32 and an axially aligned second chamber 36 provided in the upper end of the intermediate housing 26.

The intermediate housing 26 is also provided with an integral guide hub 37 protruding coaxially into the chamber 36 having a vertical bore 38 therethrough which is axially aligned with an intermediate bore or third chamber 39, a counterbore or fourth chamber 40, and a lower or fifth chamber 41. A service outlet port 42 which is connected to the trailer service line 17, as previously mentioned, is provided through the intermediate housing 26 and intersects the intermediate bore 39 near the mid-portion thereof, and a service inlet port 43 is similarly provided having one end connecting with the tractor service line 10, as previously mentioned, while the other end thereof intersects the mid-portion of the counterbore 40. An emergency line outlet 44 which connects with the trailer emergency line 19, as mentioned hereinbefore, is also provided through the intermediate housing 26 intersecting the lower chamber 41 near the mid-portion thereof.

The lower housing 29 is provided with a sixth chamber 45 in axial alignment with the intermediate housing chamber 41 and having an integral, upward extension 46 protruding coaxially thereinto. The extension 46 is provided with a valve stem receiving bore 47 which connects with a cross passageway 48 near the lower end thereof for damping prevention purposes. An emergency line inlet 48 connects the tractor emergency line 3 with the lower end of the chamber 45.

A spool member 50 is positioned in the chamber 41 and abuts against the lower housing 29 and the shoulder formed by the juncture of the chamber 41 and the counterbore 40 whereby the lower end of said member 50 is sealed by the gasket 30 and an O-ring 51 is carried in the upper end of the spool member 50 and is sealably interposed between said member, said shoulder, and the side wall of said chamber 41. The spool member 50 is provided with an integral valve guide extension 52 which protrudes coaxially into the counterbore 40 having a seal carrying vertical bore 53 therethrough in axial alignment with a counterbore 54 which terminates in an aligned recess 55 in the lower end of said spool; and, a cross passage 56 which is in constant communication with said emergency line outlet 44 intersects said counterbore 54 near the upper end thereof.

An emergency valve 57 which controls communication between the tractor and trailer emergency lines 3 and 19, respectively, is provided with a stem 58 which is reciprocally received in the lower housing extension bore 47. When the tractor protector valve 2 is not connected in the system, the valve 57 is normally biased into sealable engagement with a cooperating seat 59 on the spool member counterbore 54 by the compressive force of a spring 60 interposed between said valve 57 and the end wall of the lower housing chamber 45. A service valve 61 is provided with a stem 62 having an exhaust passage 63 therethrough. The lower end of the stem 62 is normally positioned slightly above the valve 57. This position is normally maintained by the compressive force of the spring 64 interposed between the upper end of the spool member 50 and the service valve 61 which normally biases said valve into sealable engagement with a cooperating valve seat 65 formed by the junction of the intermediate bore 39 and counterbore 40, thereby controlling communication between the tractor and trailer service lines, 10 and 17, respectively.

The compressive force of a spring 66 interposed between a head 67 on an exhaust valve member 68 and the end wall of the chamber 36 normally biases said head into abutting engagement with the diaphragm 28 which in turn is biased thereby into abutting engagement with the portion of the upper housing 25 around the lower end of the passage 31. The exhaust valve member 68 is provided with an integral seal carrying stem 69 which is reciprocally received in the intermediate housing bore 38 and extends coaxially into the intermediate bore 39 with the lower end thereof positioned slightly above the valve 61, said position being normally maintained by the compressive force of the spring 66. An exhaust passage 70 is provided in the stem 69 which is intersected by a plurality of cross passages 71 in the upper portion thereof. In this manner, the trailer service and emergency lines 17 and 19, respectively, are afforded access to the exhaust port 72 via the stem passage 63 of the valve 61, the exhaust passage 70 and cross passage 71 of the exhaust valve member 68, and the chamber 36 when the valve 2 is not connected, and under emergency conditions.

The exhaust port 72 in the intermediate housing 26 is connected with the chamber 36 near the lower end thereof, said exhaust port comprising a bore 73 axially aligned with a counterbore 74 which terminates in a recess 75. An exhaust check valve assembly 76 is normally biased into sealable engagement with the shoulder formed by the juncture of the exhaust port bore 73 and counterbore 74 by the compressive force of a light spring 77 interposed between said exhaust check valve and a perforated cage 78. The cage 78 is maintained in the recess 75 against displacement by a snap ring 79.

In the operation of the tractor protector valve 2 with the component parts thereof positioned as described hereinabove and with no air in the system, the emergency and service valves 58 and 61 are seated thereby allowing the trailer emergency line 19 access to the exhaust port 72; and, under these conditions, the relay emergency valve 18 automatically connects the reservoir 20 with the power cylinder 23 to set the trailer brakes. When the compressor 1 commences to displace pressure fluid into the system, said pressure fluid flows through the emergency line 3 and reservoir 4, the conduit 11 and passage 13 of the charging valve 12 into the charging port 33 of the tractor protector valve 2 and therefrom via passages 31 and 35 into the recess 32. When the fluid pressure in the passage 31 and recess or chamber 32 acting on the effective area of the diaphragm 28 creates a force great enough to overcome the compressive force of the spring 66, the diaphragm and exhaust valve member are moved downwardly. This downward movement unseats the service and emergency valves 61 and 58 against the compressive force of their respective springs 64 and 60 while closing the exhaust stem passages 63 and 70, respectively, of said service valve and the exhaust valve member 69. In this manner, pressure fluid communication is established between the emergency lines 3 and 19 allowing a fluid pressure build-up in the trailer reservoir 20; and, pressure fluid communication is also established between the service lines 10 and 17. When the service and emergency valves 61 and 58, respectively, are open, as described above, and the system has attained the maximum predetermined pressure commensurate with that of the compressor 1, the operation of the vehicle brakes in service is completely controlled by the operator through the application valve 6.

In the event of a severe leak in the trailer emergency line 19 or if said trailer emergency line is severed, as in a tractor break-away situation, the fluid pressure in said line would be diminished at a rate great enough to actuate either a metering or non-metering type relay emergency valve automatically causing an emergency application of the trailer brakes. Since the emergency valve 58 is unseated, pressure fluid in the tractor reservoir 4 and consequently in the chamber 32 of the tractor protector valve 2 is diminished at a very rapid rate until the compressive forces of the springs 60, 64 and 66 overcome the force of said diminished fluid pressure acting on the effective area of the diaphragm 28. When this diminution of fluid pressure occurs at a rapid rate, as above, the combined compressive forces of the springs 60, 64, and 66 affords a snap action to reseat the emergency and service valves 58 and 61, respectively, in order to preserve the tractor reservoir fluid pressure; and, at the same time, the exhaust passages 63 and 70 of the service valve 61 and exhaust valve member 68 are opened.

In the event of a severe leak or a break in the trailer service line 17, actuation of the application valve 6 diminishes the fluid pressure in the tractor reservoir 4 and chamber 32 of the tractor protector valve 2 rapidly causing operation of said tractor protector valve in the manner hereinbefore described to afford a snap action to reseat the emergency and service valves 58 and 61, respectively, and simultaneously open the exhaust passages 63 and 70 of said service valve and exhaust valve member 68. When the trailer emergency line 19 is exhausted at a rapid rate, as described above, both a metering and non-metering type relay emergency valve is automatically operable to cause an emergency application of the trailer brakes; and, as before, the tractor protector valve 2 preserves the integrity of the tractor braking system to afford the operator enough fluid pressure to make an emergency application of the tractor brakes.

In the case of a very slow leak down of fluid pressure in the trailer emergency line 19, a metering type relay emergency valve automatically functions to vent said trailer emergency line 19 to atmosphere at a predetermined minimum fluid pressure causing an emergency application of the trailer brakes. When the trailer emergency line 19 is vented to atmosphere at a predetermined minimum fluid pressure by a metering type relay emergency valve, the diminution of the pressure fluid in the tractor reservoir 4 and chamber 32 of the tractor protector valve 2 is then rapid enough to cause operation of said tractor protector valve 2 in the manner hereinbefore described to afford a snap action to reseat the emergency and service valves 58 and 61, respectively, and simultaneously open the exhaust passages 63 and 70 of said service valve and exhaust valve member 68; consequently, the integrity of the tractor braking system is preserved for an emergency application of the tractor brakes.

As discussed hereinbefore, the emergency function of a non-metering type relay emergency valve is predicated upon the establishment of a predetermined fluid pressure differential between the trailer reservoir 20 and the trailer emergency line 19; however, in the case of a very slow leakdown of fluid pressure, the establishment of the above mentioned fluid pressure differential necessary to cause the emergency function of the relay emergency valve is obviated. For example, assuming unrestricted flow through the exhaust port 72 without the exhaust check valve 76 therein, the diminution of fluid pressure in the tractor reservoir 20 and the chamber 32 of the tractor protector valve 2 would be at such a slow rate that the emergency and service valves 58 and 61 would not be afforded a snap action in closing. Instead, the emergency valve 58 would reseat and the sevice valve 61 would remain open. Meanwhile, the emergency valve 58 and the service valve stem 62 would assume a poised position whereby the fluid pressure in the emergency line 19 and trailer reservoir 20 would slowly leak through the exhaust passages 63 and 70 of the service valve stem 62 and exhaust valve member 69 into the chamber 36 and therefrom to atmosphere via the exhaust port 72, assuming of course, unrestricted pressure fluid flow through said exhaust port. It follows that a sufficient pressure differential would never be established in this manner to cause the emergency function of a non-metering type relay emergency valve and that the trailer reservoir would eventually be bled down to atmosphere. However, when the instant tractor protector valve 2 is coupled with a non-metering type relay emergency valve in the case of a very slow leakdown of fluid pressure, the diminution of fluid pressure in the trailer reservoir 20 and chamber 32 is at such a slow rate that only the emergency valve 58 reseats while the service valve 61 remains open; and, the emergency valve 58 and service valve stem 62 assume a poised position whereby fluid pressure in the emergency line slowly leaks through the exhaust passages 63 and 70 of the service valve stem 62 and exhaust valve member 69 into the chamber 36. With the emergency valve 58 and service valve stem in a poised position, the compressive force of the spring 64 and 66 is balanced by the downwardly directed force created by the fluid pressure in the passage 31 and chamber 32 of the upper tractor protector valve housing 25 acting on the effective area of the diaphragm 28. Since the chamber 36 is sealed from the atmosphere by the exhaust check valve 76 which is positioned by the compressive force of the exhaust check valve spring 77, the fluid pressure which leaks through the exhaust passages 63 and 70 is retained in the chamber 36 acting on the effective area of the diaphragm 28 to create a force additive to the above mentioned upwardly directed forces. In this manner, the upwardly directed forces overcome the downwardly directed force imparting a snap action to unseat the service valve stem 62 and close the service valve 61; thereby, the fluid pressure in the emergency line 19 is allowed unrestricted access to the chamber 36 through the exhaust passages 63 and 70 of the fully unseated service valve stem 62 and exhaust valve member. This increased fluid pressure in the chamber 36 unseats the exhaust check valve 76 against the compressive force of the exhaust check valve spring 77 and vents the chamber 36 and the emergency line 19 to atmosphere at a sufficient rate to create the necessary fluid pressure differential between the trailer emergency line 19 and trailer reservoir 20 to cause the emergency function of a non-metering type relay emergency valve which automatically applies the trailer brakes.

From the foregoing, it is apparent that the instant tractor protector valve 2 is compatibly operable with both the metering and non-metering type trailer relay emergency valve in that said tractor protector valve will not override or obviate the emergency function of either type relay emergency valve under any emergency condition.

It is readily seen that the instant tractor protector valve 2 positively exhausts the trailer emergency line 19 at a predetermined minimum fluid pressure. When a predetermined minimum fluid pressure exists in the tractor protector valve chamber 32 on one side of the diaphragm 28 creating a downward force, the emergency valve 58 is closed and the service valve stem 62 assumes a poised position therewith which permits a small flow of pressure fluid from the trailer emergency line 19 to the chamber 36. This fluid pressure is retained in the chamber 36 by the exhaust check valve 76 acting on the effective area of the diaphragm 28 and creating a force additive to the compressive forces of service valve spring 64 and exhaust valve member spring 66 and in opposition to the above mentioned downward force; consequently, the poised position of the emergency valve 58 and service valve stem 62 is destroyed and the trailer emergency line 19 is fully vented to atmosphere, as previously discussed, at a predetermined minimum fluid pressure in the system.

It is also readily apparent that the check valve 76 in the exhaust passage 72 obviates the possibility of the tractor protector valve 2 overriding the emergency function of the non-metering type relay emergency valve under slow leak conditions. The check valve 76 permits a slight fluid pressure build-up in the chamber 36 acting on the effective area of the diaphragm 28 and creating a force which allows the emergency and service valves 58 and 61, respectively, of the instant tractor protector valve 2 a snap or quick closing action while simultaneously fully opening the exhaust passages 63 and 70 through said service valve and the exhaust valve member 69. Consequently, this snap action vents the trailer emergency line 19 to atmosphere thereby allowing a pressure differential between the trailer reservoir 20 and said trailer emergency line sufficient to automatically actuate a non-metering type relay emergency valve causing an emergency application of the trailer brakes.

Referring now in detail to Fig. 2 of the drawings, it will be seen that the braking system shown therein is substantially the same as that shown in Fig. 1, except that the tractor protector valve 2a has been modified and an emergency break-away valve 80 has been added to the system. The valve 80 may be of one of several different constructions, but is preferably such as that shown in the Freeman Patent No. 2,748,791 dated June 5, 1956.

In Fig. 2, a compressor 1 is connected to the emergency line inlet of the tractor protector valve 2a by an emergency line 3 having a reservoir 4 therein. A conduit 5 connects the inlet side of the application valve 6 with the line 3 while another line 7 extends to the brake cylinders 8 having slack adjusters 9 thereon. A service line 10a extends to an emergency break-away valve 80 and another line 11 extends to the charging valve 12 having a passage 13 connecting the inlet 14 and outlet 15.

A trailer service line 17a and trailer emergency line 19a connect the emergency break-away valve 80 with the trailer relay emergency valve 18 which may be of the metering or non-metering type.

A trailer air reservoir 20 is connected to the valve 18 by a conduit 21. Another line 22 connects the valve 18 to trailer brake cylinders 23 having slack adjusters 24 thereon.

The tractor protector valve 2a comprises an upper housing 25a sealably connected to a main housing 26a, such as by studs 27, with a flexible diaphragm 28 mounted therebetween. A cap 29a with a gasket 30a closes the lower portion of the main housing 26a. The upper housing 25a has a passage 31a which connects with a first or upper chamber 32a. A charging port 33a connects with the line 11 while the passage 31a connects with an annular recess 34a by means of a passage 35a. A second chamber 36 is adjacent to the lower side of the diaphragm 28. An exhaust valve 69 having an exhaust passage 70 and cross passage 71 is movably mounted in the chamber 36 in the vertical bore 38 and is biased against the diaphragm 28 by a spring 66. An opening or exhaust port 72 is provided in the housing 26a adjacent to the chamber 36, said port 72 being provided with a check valve assembly 76a having a spring biased member which unseats only after a predetermined pressure has been reached in the chamber 36, thereby exhausting said chamber 36 to the atmosphere.

The lower portion of the exhaust valve 69 below the bore 38 is positioned in a third chamber or bore 39 which connects with a port 42a which is connected to the emergency break-away valve 80 by means of an emergency line 81. An emergency valve 57a controls communication between the emergency lines 3 and 81. The valve 57a is positioned in another chamber 45a and is biased in sealing relation with a cooperating seat 59a by a spring 60 positioned between the emergency valve 57a and the cap 29a which is provided with an emergency line inlet 49a connected to the emergency line 3. The inlet 49a is adjacent to the lower or fourth chamber 45a.

In view of the detailed explanation of the operation of the tractor protector valve 2 shown in Fig. 1, it is believed that the operation of the modified tractor protector valve 2a is clear. The modified valve 2a is operable with both the metering and non-metering type emergency relay valve. It will be seen that the check valve 76a positively exhausts the emergency line 81 at a predetermined fluid pressure so that there is a rapid or snap action when the emergency valve 57a closes and the exhaust valve 69 moves upwardly a distance sufficient so that the emergency valve 57a uncovers the exhaust passage 70.

What I claim is:

1. In a tractor protector valve, the combination of a housing having a diaphragm therein, a first chamber adjacent to one side of said diaphragm, a second chamber adjacent to the opposite side of said diaphragm, an exhaust valve movable in said second chamber, said exhaust valve being biased into contacting relation with said diaphragm, an opening in said housing in communication with said second chamber, a check valve in said opening adapted to open to atmosphere when the pressure in said second chamber reaches a predetermined value, a third chamber in said housing, the lower portion of said exhaust valve being movable in said third chamber, said third chamber having an outlet for receiving an emergency line, another chamber in said housing, an emergency valve movable in said last-mentioned chamber in said housing, said emergency valve being allowed to move upon movement of said diaphragm and said exhaust valve, an inlet in said last mentioned chamber for receiving a tractor emergency line, and resilient means associated with said emergency valve normally urging said valve in a direction toward said exhaust valve and said diaphragm.

2. In a tractor protector valve, the combination of a housing having a diaphragm therein, a first chamber adjacent to one side of said diaphragm, a second chamber adjacent to the opposite side of said diaphragm, an exhaust valve movable in said second chamber, said exhaust valve being biased into contacting relation with said diaphragm by means of a spring, an opening in said housing in communication with said second chamber, a check valve normally closing said opening and being adapted to open to atmosphere when the pressure in said second chamber reaches a predetermined value, a third chamber in said housing, the lower portion of said exhaust valve being movable in said third chamber, said third chamber having an outlet for receiving an emergency line, said exhaust valve having an exhaust passage therethrough for connecting said second and third chambers under emergency conditions, another chamber in said housing, an emergency valve movable in said last-mentioned chamber in said housing, said emergency valve adapted to open and close said exhaust passage and being allowed to move upon movement of said diaphragm and said exhaust valve, an inlet in said last mentioned chamber for receiving a tractor emergency line, and resilient means associated with said emergency valve normally urging said valve in a direction toward said exhaust valve and said diaphragm.

3. In a tractor protector valve adapted to receive service and emergency lines, said tractor protector valve having a housing with a diaphragm therein, a first chamber adjacent to one side of said diaphragm, said first chamber having an inlet port for receiving pressure fluid from a source on said tractor, a second chamber adjacent to the opposite side of said diaphragm, an opening in said housing in communication with said second chamber, a check valve in said opening adapted to open to atmosphere when the pressure in said second chamber reaches a predetermined value, a bore in said housing, an exhaust valve movably mounted in said bore, resilient means contacting said exhaust valve and biasing said exhaust valve toward said diaphragm, another chamber in said housing, said exhaust valve having an exhaust passage therethrough adapted to connect said second chamber and said last-mentioned chamber under emergency conditions, said check valve preventing the escape of pressure to the atmosphere from said last-mentioned chamber through said exhaust passage and said second chamber under emergency conditions until a predetermined pressure has been reached in said second chamber, said pressure in said second chamber and said resilient means causing a full and rapid movement of the diaphragm.

4. In a tractor protector valve adapted to receive service and emergency lines, said tractor protector valve having a housing with a diaphragm therein, a first chamber adjacent to one side of said diaphragm, said first chamber having an inlet port for receiving pressure fluid from a source on said tractor, a second chamber adjacent to the opposite side of said diaphragm, an opening in said housing in communication with said second chamber, a check valve in said opening adapted to open to atmosphere when the pressure in said second chamber reaches a predetermined value, a bore in said housing, an exhaust valve movably mounted in said bore, resilient means contacting said exhaust valve and biasing said exhaust valve toward said diaphragm, said exhaust valve having an exhaust passage therethrough adapted to connect said second chamber and a third chamber under emergency conditions, another chamber in said housing, an emergency valve movable in said last-mentioned chamber in said housing and adapted to open and close the connection between said last mentioned chamber and said third chamber and adapted to close and open said exhaust passage, said check valve preventing the escape of pressure to the atmosphere from said third chamber through said exhaust passage and said second chamber until a predetermined pressure has been reached in said second chamber, said pressure in said second chamber and said resilient means causing a rapid and positive movement of the diaphragm and the valves within said housing under emergency conditions.

5. A tractor protector valve comprising a housing, a diaphragm in said housing, a first chamber adjacent to said diaphragm, an exhaust valve on the opposite side of said diaphragm, a second chamber adjacent to said exhaust valve, a check valve in said housing adjacent to said second chamber and adapted to open to atmosphere, a third chamber adjacent to the lower portion of said exhaust valve, an outlet in said third chamber for receiving a trailer service line, a service valve in said housing movable by said exhaust valve, a fourth chamber adjacent to said service valve, an inlet in said fourth chamber for receiving a tractor service line, a fifth chamber adjacent to the lower portion of said service valve, said fifth chamber having an outlet for normally receiving a trailer emergency line, an emergency valve in said housing movable by said service valve, a sixth chamber adjacent to said emergency valve, said sixth chamber having an inlet for receiving a tractor emergency line, and resilient means associated with said valves normally urging said valves in a direction toward said diaphragm.

6. In a tractor protector valve adapted to receive tractor and trailer service and emergency lines, said tractor protector valve having a housing with a diaphragm therein, a first chamber adjacent to one side of said diaphragm, said first chamber adapted to receive a tractor emergency line, a second chamber adjacent to the opposite side of said diaphragm, said second chamber having an opening therein to atmosphere, a check valve in said opening adapted to open when the pressure in the second chamber reaches a predetermined value, a bore in said housing, an exhaust valve slidably mounted in said bore, a spring contacting said exhaust valve and biasing said exhaust valve toward said diaphragm a third chamber in said housing adjacent to said exhaust valve, the lower portion of said exhaust valve being movable in said third chamber, said third chamber having an outlet for receiving a trailer service line, a service valve slidably mounted in said housing in axial alignment with said exhaust valve, said service valve being biased toward a seat in said housing, said service valve and said exhaust valve having a passage therethrough, a fourth chamber in said housing adjacent to said service value, the upper portion of said service valve being movable in said fourth chamber, said fourth chamber having a port for receiving a tractor service line, a fifth chamber in said housing adjacent to said fourth chamber, the lower portion of said service valve being movable in said fifth chamber, said fifth chamber having a port for receiving a trailer emergency line, a sixth chamber in said housing adjacent to said fifth chamber, an emergency valve movably mounted in said sixth chamber having an inlet for receiving a tractor emergency line, said emergency valve being biased toward a seat in said housing by a spring.

7. In a tractor protector valve adapted to receive tractor and trailer service and emergency lines, said tractor protector valve having a housing with a diaphragm therein, a first chamber adjacent to one side of said diaphragm, said first chamber adapted to receive a tractor emergency line, a second chamber adjacent to the opposite side of said diaphragm, said second chamber having an opening therein to atmosphere, a check valve in said opening adapted to open when the pressure in the second chamber reaches a predetermined value, a bore in said housing, an exhaust valve slidably mounted in said bore, a spring contacting said exhaust valve and biasing said exhaust valve toward said diaphragm, a third chamber in said housing adjacent to said exhaust valve, the lower portion of said exhaust valve being movable in said third chamber, said third chamber having an outlet for receiving a trailer service line, a service valve slidably mounted in said housing in axial alignment with said exhaust valve, said service valve being biased toward a seat in said housing, said service valve and said exhaust valve having a passage therethrough, a fourth chamber in said housing adjacent to said service valve, the upper portion of said service valve being movable in said fourth chamber, said fourth chamber having a port for receiving a tractor service line, said service valve being adapted to establish and prevent communication between said tractor and trailer service lines, a fifth chamber in said housing adjacent to said fourth chamber, the lower portion of said service valve being movable in said fifth chamber, said fifth chamber having a port for receiving a trailer emergency line, a sixth chamber in said housing adjacent to said fifth chamber, an emergency valve movably mounted in said sixth chamber having an inlet for receiving a tractor emergency line, said emergency valve being biased toward a seat in said housing by a spring, said emergency valve being adapted to establish and prevent communication between said tractor and trailer emergency lines, whereby under normal conditions said exhaust passages are closed and said service and emergency valves are open and under emergency conditions the valves move rapidly and fully to the opposite positions after the pressure in the second chamber reaches a predetermined pressure held therein by said check valve.

8. In a tractor protector valve adapted to receive service and emergency lines, said tractor protector valve having a housing with a diaphragm therein, a first chamber adjacent to one side of said diaphragm, a second chamber adjacent to the opposite side of said diaphragm, an opening in said housing adapted to exhaust said second chamber to atmosphere, a check valve in said opening adapted to open when the pressure in the second chamber reaches a predetermined value, an exhaust valve movable in said second chamber, a third chamber in said housing adjacent to said exhaust valve, said exhaust valve having an exhaust passage therethrough for connecting said second chamber with said third chamber, a fourth chamber adjacent to said third chamber, an emergency valve movable in said fourth chamber, said emergency valve adapted to close said exhaust passage and being biased toward a seat by a spring, an emergency line inlet in said fourth chamber, said emergency valve controlling the communication between the third and fourth chambers, said emergency valve adapted to cut off said communication between the third and fourth chambers when said exhaust passage is uncovered to connect said third and second chambers.

9. In a tractor protector valve adapted to receive service and emergency lines, said tractor protector valve having a housing with a diaphragm therein, a first chamber adjacent to one side of said diaphragm, a second chamber adjacent to the opposite side of said diaphragm, an opening in said housing adapted to exhaust said second chamber to atmosphere, a check valve in said opening adapted to open when the pressure in the second chamber reaches a predetermined value, an exhaust valve movable in said second chamber and biased against said diaphragm, said exhaust valve being slidable in a bore in said housing, a third chamber in said housing adjacent to said exhaust valve, the lower end portion of said exhaust valve being movable in said third chamber, said third chamber having a port therein, said exhaust valve having an exhaust passage therethrough for connecting said second and third chambers, a fourth chamber adjacent to said third chamber, an emergency valve movable in said fourth chamber in axial alignment with said exhaust valve, said emergency valve adapted to close said exhaust passage and being biased toward a seat in the housing by a spring, an emergency line inlet in said fourth chamber, said emergency valve controlling the communication between the third and fourth chambers, said emergency valve adapted to cut off said communication between said third and fourth chambers when said exhaust passage is uncovered to connect said third and second chambers.

References Cited in the file of this patent

UNITED STATES PATENTS

| | | |
|---|---|---|
| 2,277,490 | Huber | Mar. 24, 1942 |
| 2,306,746 | Niesemann | Dec. 29, 1942 |
| 2,582,612 | Williams | Jan. 15, 1953 |
| 2,656,014 | Fites | Oct. 20, 1953 |